No. 833,597. PATENTED OCT. 16, 1906.
G. G. GILBERTSON.
SEEDER AND PLANTER.
APPLICATION FILED APR. 6, 1906.
4 SHEETS—SHEET 1
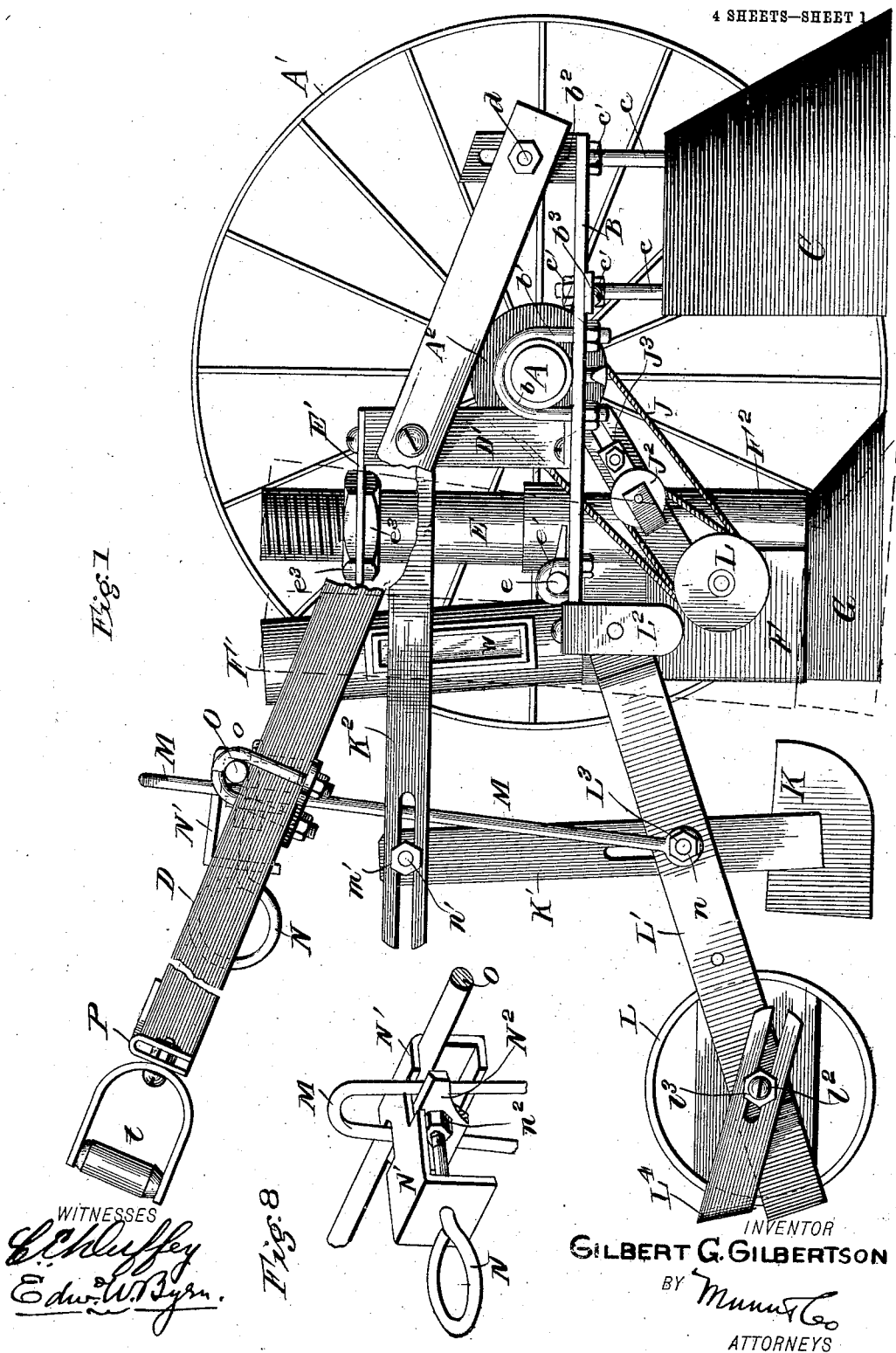
WITNESSES
INVENTOR
GILBERT G. GILBERTSON
BY
ATTORNEYS

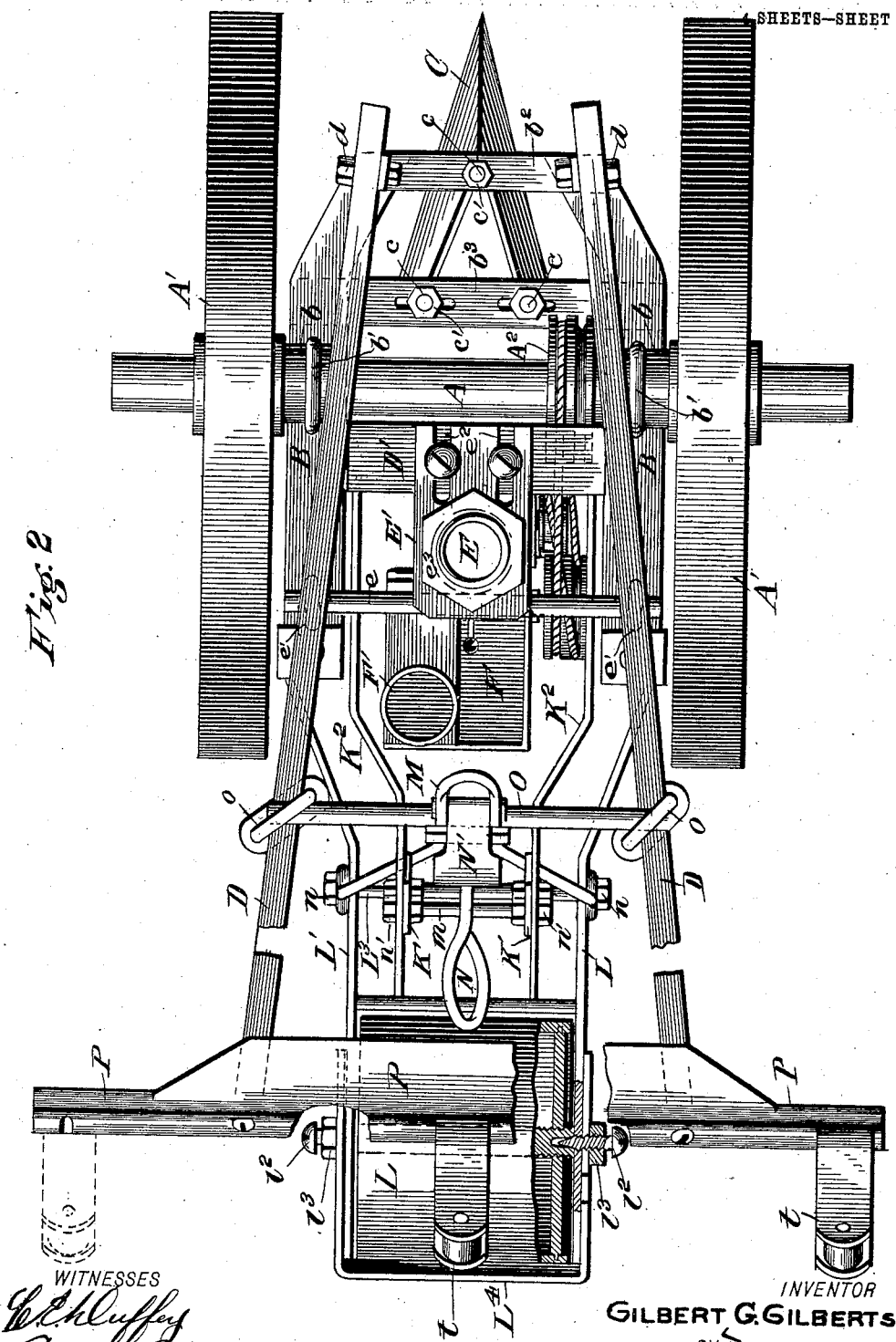

No. 833,597. PATENTED OCT. 16, 1906.
G. G. GILBERTSON.
SEEDER AND PLANTER.
APPLICATION FILED APR. 6, 1906.
4 SHEETS—SHEET 3.
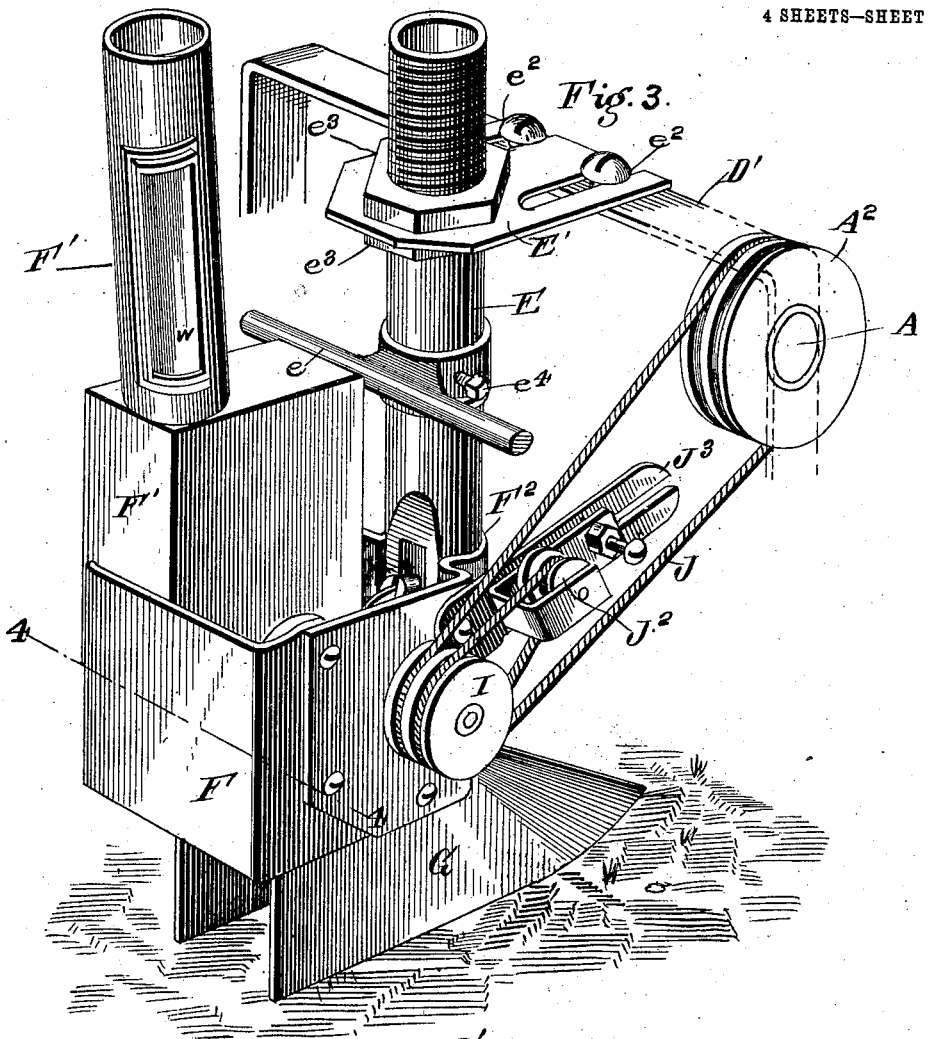
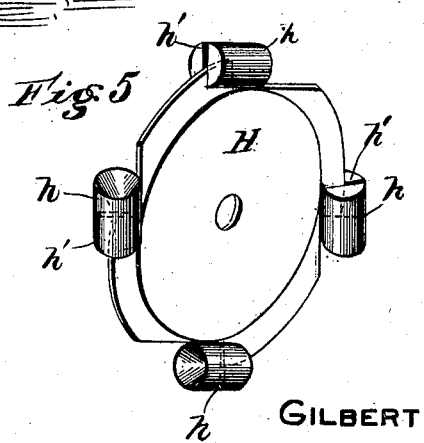
WITNESSES
INVENTOR
GILBERT G. GILBERTSON
BY
ATTORNEYS No. 833,597. PATENTED OCT. 16, 1906.
G. G. GILBERTSON.
SEEDER AND PLANTER.
APPLICATION FILED APR. 6, 1906.
4 SHEETS—SHEET 4.
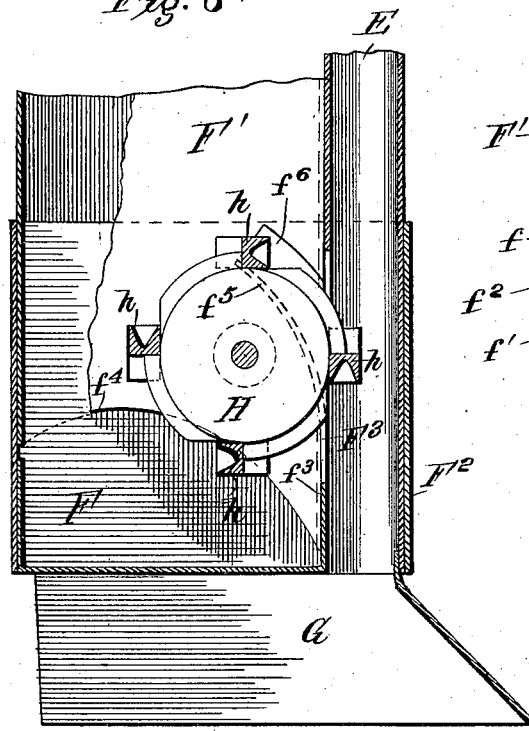
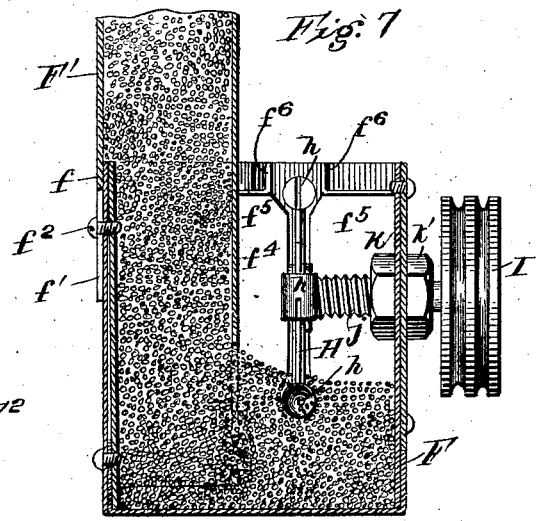
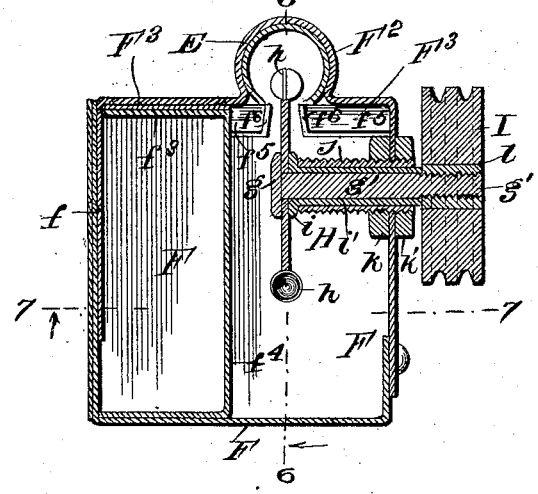
WITNESSES
INVENTOR
GILBERT G. GILBERTSON
BY
ATTORNEYS

UNITED STATES PATENT OFFICE.

GILBERT G. GILBERTSON, OF ST. ANSGAR, IOWA.

SEEDER AND PLANTER.

No. 833,597. Specification of Letters Patent. Patented Oct. 16, 1906.

Application filed April 6, 1906. Serial No. 310,240.

*To all whom it may concern:*

Be it known that I, GILBERT G. GILBERTSON, a citizen of the United States, residing at St. Ansgar, in the county of Mitchell and State of Iowa, have invented a new and useful Improvement in Seeders and Planters, of which the following is a specification.

My invention relates to seeders and planters of that type in which the device is mounted upon wheels and is provided with handles projecting to the rear by which the machine is pushed along in front of the operator, its special purpose being to plant such small seeds as onion-seed, peas, and the like. Although intended primarily for such use, it may in many of the features be applied to team-drawn seeders and be adapted for planting any kind of seed.

The invention consists in the novel construction and arrangement of parts, as hereinafter fully described with reference to the drawings, in which—

Figure 1 is a side elevation with the near wheel removed and parts broken away. Fig. 2 is a plan view with the handles broken off and shortened and part of covering-roller in section. Fig. 3 is a perspective view of the seeding devices. Fig. 4 is an enlarged horizontal section through the seed-wheel on line 4 4 of Fig. 3. Fig. 5 is a perspective view of the seed-wheel. Fig. 6 is a section on line 6 6 of Fig. 4. Fig. 7 is a section on line 7 7 of Fig. 4, and Fig. 8 is a detail perspective view.

In the drawings, A represents the main driving-axle, to which are rigidly fastened the two supporting-wheels A' A' and a band-pulley $A^2$, having two grooves of different diameters for different speeds.

The axle A is mounted to turn in sleeve-bearings $b$, connected by yokes $b'$ to the flat bars B B of the horizontal metal frame. The rear ends of these bars are parallel, and their front ends are turned inwardly toward each other and connected by a cross-bar $b^2$ at the extreme front end arranged on top of the bars B and a second cross-bar $b^3$ arranged underneath the bars B. These two cross-bars are perforated to receive the three vertical stems $c\ c\ c$ of a leveling-plow C. The stems $c$ are screw-threaded and provided with nuts $c'\ c'$ on top and beneath the bars $b^2\ b^3$, so as to permit vertical adjustment, and the holes through the cross-bar $b^3$ are slotted to permit lateral adjustment of the plow. The body of the plow has equal inclined sides and their lower edges are straight horizontal edges, and the purpose of this plow is to scrape off clods and dry earth and reduce the ground to a smooth level surface.

D D are the wooden handles by which the seeder is pushed along ahead of the operator. The front ends of these handles are bolted at $d$ to the upturned ends of the front cross-bar $b^2$, which latter are slotted for adjustment, and at a point in rear of the axle A there is an upright metal yoke D', whose lower ends are bolted to the frame-bars B B and whose upper bent portion is bolted to the wooden plow-handles D and extends across from one to the other.

E is a central carrying-post for supporting and adjusting the seeding device. This post, as shown, is a hollow metal pipe for lightness; but it may be solid. By making it hollow it is not only lighter, but the operator may look through the same from the top, and thus see if the seed-outlet at the lower end is open and not clogged by dirt. It is attached to a horizontal rock-bar $e$ by a collar and set-screw $e^4$, and the ends of bar $e$ are loosely retained within bearings $e'$ on the rear ends of the frame-bars B. At the upper end this post is sustained by the yoke D' by connection with a plate E'. This plate is slotted at $e^2$ and bolted adjustably to the yoke, and also has a large hole through it into which the upper end of the post fits, and the said upper end of the post is screw-threaded for some distance below the plate E' and is provided with screw-nuts $e^3\ e^3$ above and below the plate E', by which the position of the post in the plate is fixed and may be adjusted, as hereinafter described.

The lower end of the post E is connected to and supports the seedbox F and its operating devices and also the furrower-opener G, which is connected to the discharge-throat of the seedbox. If it be desired to raise or lower bodily the furrow-opener and seed devices, the post is loosened from its supporting-collar by means of the set-screw $e^4$, and the nuts $e^3\ e^3$ are loosened above and below the plate E', and the whole system of seeding devices may be raised or lowered and again fixed in place at the desired adjustment. If it be desired to merely change the inclination of the furrow-opener to cause it to run deeper or shallower, then the bolts that hold plate E' to the yoke D' are loosened and the post is rocked forward or backward with the cross-bar $e$ as a center and is again fixed in place by readjusting the bolts on plate E′, as indicated by dotted lines in Fig. 1.

The seedbox F (see Figs. 3 to 7) has opening into one side of it a long upright seed-reservoir F′, which at its lower end is rectangular in shape and slides into the seedbox and is adjustable in relation thereto, as follows: This reservoir may be made of a glass tube or a metal tube having an elongated glass window $w$ to show the quantity of seed in the same. One side $f$ of the lower end of this seed-reservoir is offset from the two ends and is provided with vertical slots $f′ f′$. (See Fig. 7.) This side $f$ slides down outside the seedbox, and its slots $f′$ receive the set-screws $f^2$, by which it is clamped tight. The end wall $f^3$ of the lower end of the seed-reservoir is made longer than the other walls and extends inside the seedbox down to its bottom, and the side $f^4$ is cut away along its edge, so as not to extend to the bottom of the seedbox into which it protrudes, but stops short of the bottom, so as to leave space for the seed in the reservoir to pass laterally into the seedbox and into range of the seed-dropping wheel, as seen in Fig. 7.

The seedbox is made of sheet metal, and its front wall is bent outwardly to form a throat F² to receive hollow post E, Figs. 4 and 6, which opens at its bottom into the furrow-opener G. A seed-wheel H is arranged beside the seed-reservoir in range of the seed passing under the side wall $f^4$ and serves to take up the seed and discharge them into the throat F². This seed-wheel is a thin metal disk bearing cups $h$ on its periphery. F³, Fig. 4, is a partition-plate arranged in the front side of the seedbox and shutting off from the seedbox the bottom part of the throat F². This partition has two curved tongues $f^5 f^5$ extending upwardly and lying close to the sides of the disk of the feed-wheel, with right-angle side walls or flanges $f^6$ on each side to prevent the seed in the cups of the wheel from falling back into the seedbox or going sidewise at the moment of inversion. This partition-plate F³ is held in place in the seedbox between the front wall of the same and the extended front wall $f^3$ of the seed-reservoir, as seen in Fig. 4.

The seed-wheel has its disk cut away at intervals to form radial edges, something like the teeth of a circular saw, and on these edges the seed-cups $h$ are secured as follows: The cups have solid bottoms, which are slitted at $h′$, and these slits or slots are slipped over the radial edges of the disk and are then swaged or pinched to bind thereon, which forms an easy and quick mode of attachment. To insure against looseness, a drop of solder may be applied to the joint between the cup and the disk. There are four, more or less, of the cups on the disk, and the disk is connected to a compound shaft turning in a bearing supported in the side of the seedbox, as follows:

The disk (see Fig. 4) is clamped between two collars $g$ and $i$. The collar $g$ is fast on a stem $g′$, and the collar $i$ is fast on a sleeve $i′$, surrounding stem $g′$. A pulley I is screwed, by means of its metal bushing $l$, onto the screw-threaded end of stem $g′$ and is made to bear against the sleeve $i′$, so as to firmly clamp the disk between the two collars $g$ and $i$ and also connect the pulley I thereto. The outer surface of sleeve $i′$ then becomes the journal which turns in another sleeve-bearing $j$, which passes through the side wall of the seedbox F and is clamped thereto rigidly by two nuts $k$ and $k′$ on opposite sides of the wall of the seedbox, which nuts mesh with a screw-thread on the exterior of the sleeve-bearing. This forms a long and stiff journal-bearing in the side wall of the seedbox and allows the seed-wheel to be turned from the exterior of the seedbox through a belt on the pulley I. This pulley is rotated by a belt J, (see Fig. 3,) which extends to and derives motion from the pulley A² on the main shaft. This belt J has two wraps around the pulley I to prevent slipping, and in a bight or loop of this double wrap is placed a belt-tightening pulley J², adjustably fixed in a slotted plate J³, projecting forwardly from the seedbox. This pulley by its adjustment takes up any slack in the belt due to the adjustment of the carrying-post.

In rear of the seedbox there are arranged two oppositely-inclined covering-blades K K, which cover the seed in the furrow, and a roller L, which presses down the earth thereon. These parts are carried in an adjustable framework, as follows: The roller L is journaled in a yoke-shaped frame L′, whose front divergent bars are pivotally connected to hanger-bars L², depending from the rear ends of the frame-bars B B. The coverer-blades K are connected to the lower ends of upright bars K′, which are slotted at an intermediate point to give passage to a cross-rod L³, connecting the two sides of the yoke-frame L′, the upright bars K′ being adjustably clamped to the cross-rod L³ by nuts $n$. The tops of the upright bars K′ are connected to a horizontal rod $m′$, which passes through slots in the rear ends of horizontal rearwardly-projecting bars K², attached at their forward ends to the yoke D′ of the seeding devices. Nuts $n′$ clamp the rod $m′$ adjustably in the slots of the rearwardly-projecting bars K². This connection permits the upper and lower ends of upright bars K′ and the coverer to be adjusted forwardly or rearwardly, while the lower slots of the upright bars permit vertical adjustment.

M is a loop-shaped lifting-bar whose two lower ends are loosely connected to the ends of the cross-rod L³ of the roller-yoke and thence rising are bent inwardly, so as to pass between the bars K², and thence extend in parallel position to the upper bent end or loop. This loop-bar is for the purpose of lifting and adjusting up or down the coverer-blades and roller. This lifting-bar is clamped at various heights by a set-screw N, which swivels in a U-shaped piece N'. (See Fig. 8.) The set-screw N has a collar $n^2$, that bears against a plate $N^2$ and clamps the two members of the loop-bar between the plate and a flange at the bottom of the U-shaped piece N'. This U-shaped piece is notched on each side to give passage to the two members of the loop-bar. This U-shaped piece embraces a cross-bar O, which is supported upon the two handles D, being attached firmly to the same by yoke-clips o.

On the roller L, Figs. 1 and 2, is arranged a scraper $L^4$, whose two sides are bent down over the ends of the roller and are slotted and made to embrace a center bolt $l^2$ on each side and are secured to said bolts by nuts $l^3$. These center bolts enter cavities in the axial shaft of the roller to permit the latter to be readily taken out. On the rear ends of the wooden handle-bars D is secured a long cross-bar P, made of angle-iron and bolted to the ends of the wooden handle-bars. Two handles t, consisting of U-shaped metal pieces with handholds between them, are secured to this cross-bar P. One of these handles is in the center and is immovable. The other is adjustably fitted interchangeably by means of a slot and clamp-nut and bolt to either one of the extreme ends of the bar P. When attached to one end, it throws the position of the operator to one side of the roller and the row of planted seed and when adjusted to the other end it throws the position of the operator to the other side, as may be rendered desirable by the special conditions of the planting. If desired, there may be three immovable handles. The two supporting-wheels A' A' are adjustably fixed on the axle the right distance apart between the rows, so as to act as markers.

I claim—

1. A seeder and planter, comprising a frame with supporting-wheels, a seedbox and furrow-opener, a vertical supporting-post attached to and extending upwardly from the seedbox, a horizontal transverse rock-bar attached to the post and arranged in bearings on the framework and a second support for the post arranged at the upper end and made adjustable as described.

2. A seeder and planter, comprising a frame with supporting-wheels, a seedbox and furrow-opener, a vertically-supporting post attached to and extending upwardly from the seedbox, a horizontal transverse rock-bar attached to the post and arranged in bearings on the framework and a second support for the post arranged at its upper end, said post being made vertically adjustable in its upper support and said support being made horizontally adjustable on the framework.

3. A seeder and planter, comprising a frame with supporting-wheels and rigidly-attached axle bearing a belt-pulley, a seedbox and furrow-opener arranged in rear of the axle, a vertical supporting-post having its lower end connected to the seedbox, and its upper portion connected to the framework, a seed-wheel with grooved pulley outside the seedbox and a belt connecting said pulleys with the pulley on the shaft.

4. A seeder and planter, comprising a frame with supporting-wheels and rigidly-attached axle bearing a belt-pulley, a seedbox and furrow-opener arranged in rear of the axle, a vertical supporting-post having its lower end connected to the seedbox, a rocking support for the middle of the post, an adjustable connection for the top of the post, a seed-wheel having a pulley outside the seedbox, a belt connecting the same to the pulley on the shaft and a take-up pulley for the belt to compensate for the adjustment of the post and the seedbox and furrow-opener.

5. A seeder and planter comprising a wheeled frame, a front leveling-plow, a combined seedbox and furrow-opener arranged in rear of the leveling-plow, two inclined covering-blades arranged in rear of the seedbox, and a roller arranged in rear of the covering-blades said roller and covering-blades being mounted in a vertically-adjustable frame.

6. In a seeder and planter, a seedbox having in one wall of the same an exteriorly-screw-threaded journal-bearing with clamping-nuts arranged upon opposite sides of the wall of the seedbox, a compound shaft carrying a disk-shaped seed-wheel inside the box and a pulley outside the box, said compound shaft consisting of a central stem with a collar arranged on one side of the seed-wheel and a concentric sleeve with a collar on the other side of the seed-wheel, the pulley being screwed upon the central stem and bearing against the concentric sleeve to clamp the seed-wheel, compound shaft, and pulley tightly together.

7. In a seed-planter, a seed-wheel consisting of a thin disk having cut-away portions on its periphery and seed-cups having solid ends slitted to receive the disk and pinched together thereupon as described.

8. In a seed-planter, a seedbox having a seed-wheel in one side of the same and on the other side having an upright seed-reservoir cut away on the side next to the seed-wheel, the front end of the said box being swelled outwardly to form a discharge-throat, and a partition-plate arranged between said throat and the seed-wheel and slitted to form two sections extending up on opposite sides of the seed-wheel.

9. In a seeder and planter, the combination with the frame, its supporting-wheels and its seedbox and furrow-opener; of two horizontal bars connected to the frame in front and extending rearwardly and slotted at their ends, two upright bars having an adjustable connection with the slotted ends of the horizontal bars and carrying covering-blades at their lower ends, a rearwardly-extending yoke-shaped frame bearing a roller and an adjustable connection between the yoke-shaped frame of the roller and the upright bars of the coverers.

10. In a seeder and planter, the combination with the frame, its supporting-wheels and its seedbox and furrow-opener; of horizontal and upright bars carrying covering-blades, a rearwardly-extending frame bearing a roller and connected to the upright bars of the coverers, rearwardly-extending handles, a lifting-bar for the roller-frame extending up to the handles and means for adjustably connecting said lifting-bar to the handles.

11. In a seeder and planter, a covering-roller having a central shaft, a yoke-shaped frame inclosing the same, a scraper having its ends bent down and slotted, center screw-bolts passing through said slots and the roller-frame and forming pivotal centers for the roller, and nuts arranged upon said center bolts for adjustably holding the scraper.

GILBERT G. GILBERTSON.

Witnesses
A. C. GILBERTSON,
H. McNIDER.